No. 771,676. Patented October 4, 1904.

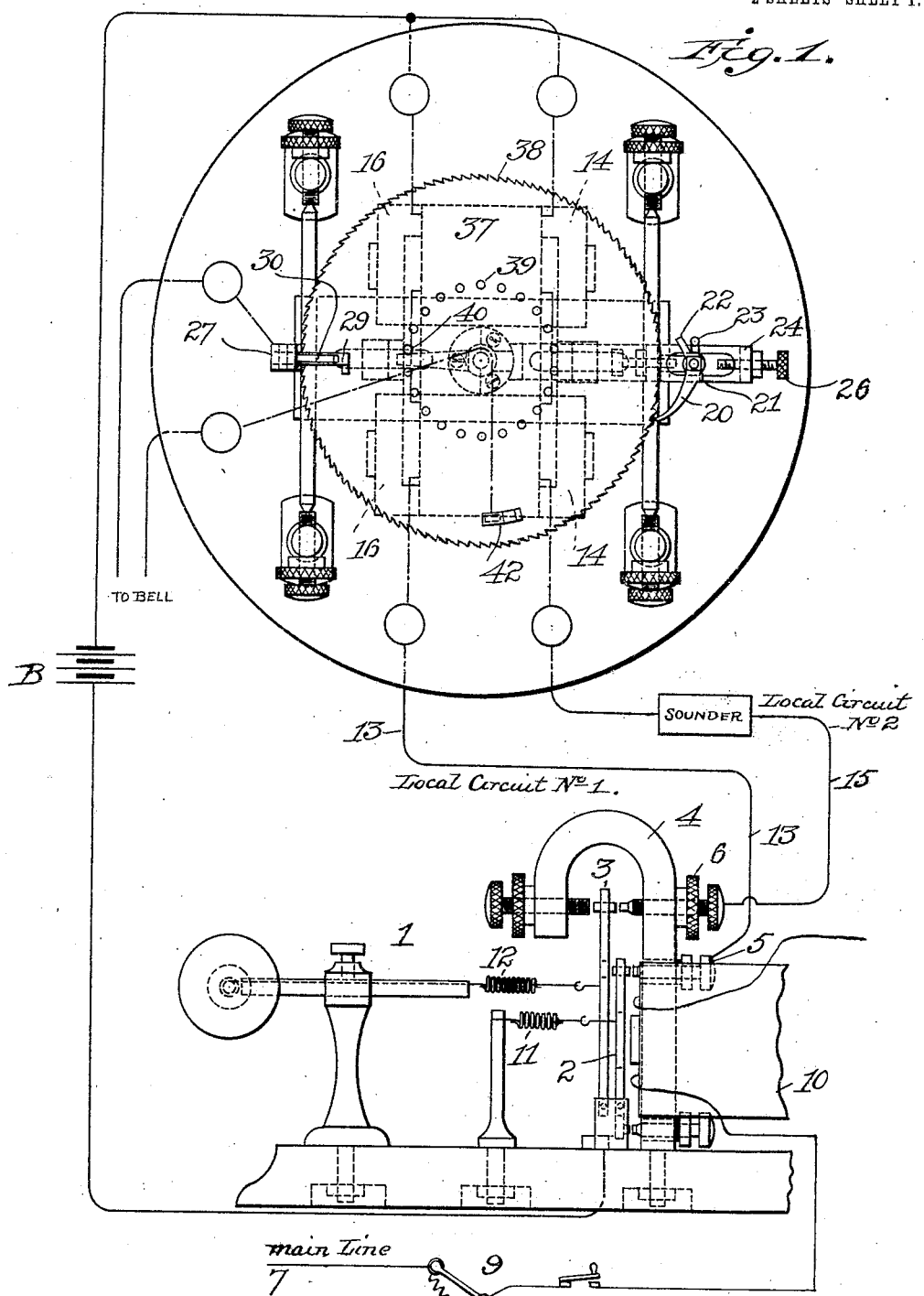

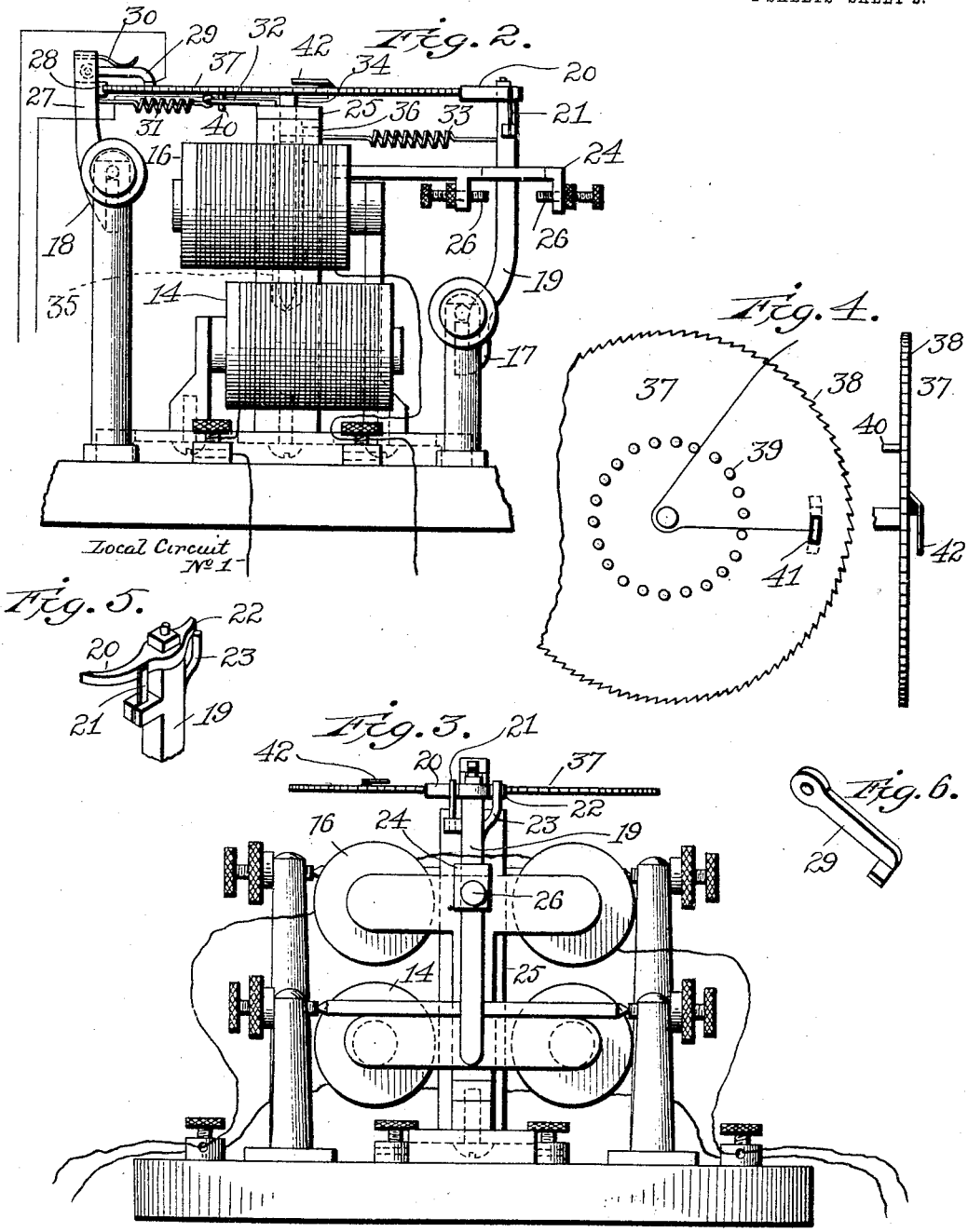

UNITED STATES PATENT OFFICE.

JESSE S. SNEAD AND WILLIAM O. BALLARD, OF ATLANTA, GEORGIA.

TELEGRAPH CALL SYSTEM.

SPECIFICATION forming part of Letters Patent No. 771,676, dated October 4, 1904.

Application filed March 17, 1904. Serial No. 198,637. (No model.)

*To all whom it may concern:*

Be it known that we, JESSE S. SNEAD and WILLIAM O. BALLARD, citizens of the United States of America, residing at Atlanta, in the county of Fulton and State of Georgia, have invented certain new and useful Improvements in Telegraph Call Systems, of which the following is such a full, clear, and exact description as will enable others skilled in the art to which it appertains to make and use the same, reference being had to the accompanying drawings, forming a part hereof.

This invention is a call system intended especially for use on telegraph-lines, the particular object being to provide means whereby any one station on the line may call any other station without calling any station but the one desired. This object is attained by the use of such appliances as are illustrated in the accompanying drawings; and the invention consists in certain novel features of construction, arrangement, and combination of parts, as will be hereinafter first fully described and then particularly pointed out in the appended claims.

In the drawings, Figure 1 is a diagrammatic view of an apparatus embodying our invention, the relay being shown in side elevation and the bell-controlling devices being shown in plan view. Fig. 2 is a side elevation of the bell-controlling devices. Fig. 3 is a side elevation taken at right angles to Fig. 2. Fig. 4 is a detail showing the bell-controlling disk in plan and edge view, and Figs. 5 and 6 are detail views of the vibratory arms which coact with the bell-controlling disk.

Referring to the drawings, 1 designates a relay of the usual or any preferred form, except that it is provided with a supplemental armature 2 in addition to the usual armature 3. The bracket 4 is provided with an additional binding-post 5 and the usual binding-post 6, forming parts of the local circuits with the respective armatures. In the main-line circuit 7 we interpose a resistance-coil 8 at the main or central station or, if preferred, at each station, and also a short-circuiting device 9, by means of which the current passing through the magnet 10 of the relay may be weakened at will.

It will be observed that the supplemental armature 2 is shorter than the armature 3 and is arranged between the same and the magnet, the spring 11, attached thereto, being weaker than the spring 12, attached to the armature 3. This armature forms part of a local circuit, which we will for convenience designate as "local circuit No. 1," the course of the circuit being from the battery B to the armature, thence through the binding-post 5 and the wire 13 to a pair of magnets 14, situated below the bell-controlling disk, and thence to the battery. The armature 3 is part of what we term "local circuit No. 2," which runs from the battery B to the armature, thence through the wire 15 to the usual sounder, and then to a pair of magnets 16, situated below the bell-controlling disk and above the magnets 14, as clearly shown in Figs. 3 and 4, and thence to the battery. The magnets 14 and 16 are supported in the usual or any convenient manner, and their armatures 17 18 depend from their respective pivots and are provided with upwardly-projecting arms. The arm 19, rising from the armature 17, has a pawl or dog 20 pivotally mounted on its upper end, which dog or pawl is normally pressed inward or toward the bell-controlling disk by a spring 21, carried by the arm 19, and is provided with an extension 22, adapted to impinge against a stop 23 on the side of the arm 19, and thereby limit the movement of the dog. The arm 19 passes through a slotted guide-arm 24, projecting laterally from a post 25, rising from the base between the magnets, and the vibratory movement of the said arm 19 is limited by means of adjustable stops 26, mounted on the under side of the said guide-arm. The arm 27, rising from the armature 18, is provided on its inner side near its upper end with a tooth or detent 28, adapted to engage the edge of the bell-controlling disk, and above the said detent a contact lever or arm 29 is pivotally attached to the arm 27, said contact-arm being held down upon the disk by a spring 30, as shown.

The arm 27 is drawn normally inward against the influence of the magnets 16 by a spring 31, which has its inner end attached to a stop plate or arm 32, extending laterally from the post 25. The arm 19 is likewise drawn inward againt the influence of the magnets 14 by a spring 33; but the inner end of the said spring 33 is wrapped around a stem or journal 34, depending centrally from the bell-controlling disk and adapted to rotate in a socket 35 in the post 25, the said post being provided with a slot 36 in its front side to permit the passage of the end of the spring. An obvious modification of this preferred and illustrated arrangement is to attach a winding-cord to the end of the spring and run the cord around the stem or journal.

The bell-controlling disk 37 is secured to or formed on the upper end of the stem 34, and its edge is formed into ratchet-teeth 38, which are engaged by the detent 28 and the pawl or dog 20 in the operation of the invention. Arranged concentrically around the center of the disk is a series of openings 39, corresponding in number to the stations along the line. In one of the openings a pin 40 is secured, the position of the pin in any one instrument being determined by the station to be called by the instrument. Near the edge of the disk is a contact-point 41, which is adapted to close the circuit through the bell at the proper time by coming into contact with the contact-arm 29, the wires for this circuit leading from the bell and its battery to the contact-arm 29 and across the disk to the contact-point 41, respectively, as will be readily understood. This contact-point 41 consists of a small block of platinum of the same thickness as the disk and secured in an opening formed in the disk, being insulated from the disk by a filling of hard rubber between the block and the walls of the opening, as clearly shown in Fig. 4 and as will be readily understood. The particular form of the bell is no part of our invention; but we prefer to use the continuously-ringing bell, as such bell will ring until the operator at the station called stops it, and consequently the desired communication is bound to be established. In order to protect the point 41 from undesired contact with the arm 29, we provide a cover or plate 42, which projects over the said point 41 and is adapted to ride under the arm 29.

The normal position of the several parts of the apparatus is that occupied when telegraphic messages are being sent or may be sent. In this position the short-circuiting device is arranged as shown in Fig. 1, so that the main-line circuit passes directly between the two points of the said device or switch, and the full strength of the current when the sending-key is pressed down to close the circuit will pass through the magnet 10 and will actuate the armatures 2 and 3, so that both local circuits will be active and the two vibratory arms 19 and 27 will be held away from the bell-controlling disk while the circuit is closed. The said disk will then be in its initial position with the pin 40 in contact with the arm 32. If the operator at the head or main office, for example, desires to call up one of the stations along the line, he will throw off the switch or short-circuiting device 9, so that the main-line current will be caused to pass through the resistance-coil 8, and consequently the current passing through the magnet 10 will be weakened, so that the armature 2 will be actuated; but the armature 3 will be inactive, owing to the difference in their distances from the magnet. Hence the local circuit No. 1 will be alive, but the local circuit No. 2 will be dead, and the arm 27 will be drawn against the bell-controlling disk by the spring 31, and the detent 28 will be held in engagement with the disk. As the local circuit is, however, passing through the magnets 14 the armature 17 will be attracted, and the operator by manipulating his key to make and break the circuit will cause a vibration of the said armature and the arm rising therefrom, the result being that the dog 20 is caused to engage the teeth of the disk and rotate the disk, thus bringing the contact-point 41 toward the contact-arm 29. When the said point and arm are in the line of the same diameter of the disk, the operator throws back the switch or device 9, so as to cut out the resistance-coil and let the full strength of the main-line circuit through the magnet 10. The armature 3 will then be attracted, so as to close the local circuit No. 2, and consequently cause the magnets 16 to attract the armature 18, the result being that the arm 27 will be swung slightly outward and the end of the contact-arm 29 dragged over the disk, so as to pass under the cover 42 and make contact with the point 41, thereby closing the bell-circuit and causing the bell to ring once. When the station operator responds to the call thus sounded, the message is transmitted in the usual manner. When the resistance is cut in and the disk is being fed around to close the bell-circuit, the detent 28 is in positive engagement with the disk and positively prevents retrograde movement of the same; but when the resistance is cut out the detent is drawn from engagement with the disk at the same time that the bell-circuit is closed through the point 41 and the arm 29, and the spring 33 then automatically returns the disk to its initial position by rotating it in the opposite direction. The arm 29 is drawn over the point 41 so quickly, however, that the disk does not have time to start on the reverse movement before the bell-circuit is closed, inasmuch as the two contact-points are separated when the arm 29 starts on its outward dragging movement a distance not greater than the depth of a tooth on the edge of the disk. This reverse rotation of the disk is arrested by the pin 40 impinging against the stop 32. Of course when the disk is thus reversely rotated the contact-point 41 is carried away from the contact-arm 29, and the distance to which it is carried is determined by the position of the pin 40, so that by placing the said pins in different positions in the different instruments the bell-circuit will not be simultaneously closed at all stations, and consequently one station may be called without calling any other station. The names of the stations or the call-signals therefor being arranged in regular order on the disks at all the stations, as well as at the main station, any operator can tell by a glance at his own instrument (if the disk be rotating) which station may be called at any point of the rotation, and consequently any operator may call any other operator or station. This use of the device, however, is dependent upon the employment of a resistance-coil 8 at each station, as will be readily understood; but if it be desired that all calls be made from the main office the resistance-coil will be provided at that office only. The names of the stations will be preferably arranged so that when the name of the desired station is in line with the contact-arm 29 the calling operator will know that the disk at that station is in position to close the bell-circuit on the resistance-coil being cut out.

The apparatus needed to carry our invention into practice, it will be readily seen from the foregoing description, is very simple, and a long line with a large number of stations may be equipped at a comparatively slight expense. It will be seen that the bell at the station called will be rung, but none of the others will be rung, and that the use of the device does not in any way interfere with the transmission of messages over the line. The apparatus is particularly advantageous when used in connection with a continuously-ringing bell, as the operator then must answer and manually stop the bell. If the operator is at a small station where he has other duties, this is obviously a very desirable result. An operator at a small station which is generally closed at night may have the bell-circuit extended to his sleeping-quarters, so that the bell will awaken him, and consequently the time usually lost in depending on the casual passer-by or some waiting train-crew will be saved. The time required to bring the disk into the calling position is so slight that all the stations may be successively called in very little more time than is now needed to call a single station.

While our device is designed more especially for use on telegraph-lines and for railway service, it is to be understood that its use on a telephone-line will involve no departure from our invention.

Having thus described our invention, what we claim, and desire to secure by Letters Patent, is—

1. A call system comprising a bell-circuit, means for closing said circuit, a main-line circuit having the full strength of the current normally thereon, and means whereby upon a weakening of the main-line circuit the said bell-circuit-closing means may be brought to the circuit-closing position and upon a restoration of the strength of the main-line circuit will be caused to close the bell-circuit and then return to its normal position.

2. A call system comprising a bell-circuit, means for closing said circuit, local circuits to operate said means, a main-line circuit controlling said local circuits, and a resistance-coil and short-circuiting device in the main-line circuit whereby both local circuits may be kept active or one cut out at will.

3. A call system comprising a bell-circuit, means for closing said circuit, two normally active local circuits to operate said means, a relay in the main-line circuit having an armature in each local circuit, said armatures being at different distances from the relay-magnet, and means for weakening the main-line current through the relay whereby only the armature nearer the magnet will be actuated and the corresponding local circuit kept active.

4. A call system comprising a bell, a rotatable disk having a contact-point, a contact-arm coacting therewith, said disk and arm being in circuit with the bell, a main-line circuit having the full strength of the current normally thereon, and means whereby a weakening of the main-line current will rotate the disk to bring its contact-point to the contact-arm and the full strength of the main-line circuit will bring said arm and point into contact to close the bell-circuit and then permit the disk to return to its initial position.

5. A call system comprising a bell, a rotatable disk having a contact-point, a vibratory arm carrying a contact-arm held down upon the disk, said contact-arm and contact-point being in circuit with the bell, a detent on said vibratory arm adapted to engage the disk, means for rotating the disk, means for disengaging the detent from the disk, and means for returning the disk to its initial position after the detent is disengaged.

6. The combination of a bell-circuit, a rotatable disk carrying one terminal of said circuit, two magnets below the said disk, armatures for said magnets, vibratory arms rising from said armatures past the edge of the disk, a bell-circuit terminal carried by one of said arms and bearing against the surface of the disk, a disk feeding-pawl carried by the other of said arms, and means for energizing one of said magnets to actuate the disk feeding-arm and for simultaneously energizing both magnets to draw both arms away from the disk.

7. The combination of a supporting-post, a disk having a depending journal fitted in said post, a feeding-arm to rotate the disk in one direction, and a spring to hold the said arm in engagement with the disk, the said spring being connected with the journal of the disk to rotate the same in a reverse direction.

It testimony whereof we have signed this specification in the presence of two subscribing witnesses.

JESSE S. SNEAD.
WILLIAM O. BALLARD.

Witnesses:
W. W. HASKELL,
A. V. TOOLE.